United States Patent
Song

(10) Patent No.: US 9,853,474 B2
(45) Date of Patent: Dec. 26, 2017

(54) BATTERY PACK AND DRIVING METHOD THEREOF

(71) Applicant: Samsung SDI Co., Ltd., Yongin-si, Gyeonggi-do (KR)

(72) Inventor: Hyun-Chul Song, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 183 days.

(21) Appl. No.: 14/848,928

(22) Filed: Sep. 9, 2015

(65) Prior Publication Data

US 2016/0099585 A1 Apr. 7, 2016

(30) Foreign Application Priority Data

Oct. 6, 2014 (KR) ........................ 10-2014-0134244

(51) Int. Cl.
*H02J 7/00* (2006.01)

(52) U.S. Cl.
CPC ..... *H02J 7/0068* (2013.01); *H02J 2007/0098* (2013.01)

(58) Field of Classification Search
CPC ........................ H02J 7/0068; H02J 2007/0098
See application file for complete search history.

(56) References Cited

U.S. PATENT DOCUMENTS

| | | | | |
|---|---|---|---|---|
| 2007/0090793 A1* | 4/2007 | Eguchi | ............... | G06F 1/263 320/112 |
| 2010/0033124 A1* | 2/2010 | Ngosi | ............... | H02J 7/35 320/101 |
| 2014/0091770 A1* | 4/2014 | Lee | ............... | H04Q 9/00 320/135 |
| 2014/0115191 A1* | 4/2014 | Kim | ............... | G06F 13/42 710/4 |

FOREIGN PATENT DOCUMENTS

| KR | 10-1999-0041087 A | 6/1999 |
|---|---|---|
| KR | 10-2013-0058373 A | 6/2013 |
| KR | 10-2014-0078323 A | 6/2014 |

* cited by examiner

*Primary Examiner* — Nha Nguyen
(74) *Attorney, Agent, or Firm* — Knobbe Martens Olson & Bear LLP

(57) ABSTRACT

A battery pack and a driving method thereof are disclosed. In one aspect, the method includes outputting first data at the first rack BMS, determining whether a response to the first data has been received, and driving the first rack BMS based on whether the response has been received.

18 Claims, 4 Drawing Sheets

BATTERY PACK AND DRIVING METHOD THEREOF

CROSS-REFERENCE TO RELATED APPLICATIONS

This application claims priority to and the benefit of Korean Patent Application No. 10-2014-0134244, filed on Oct. 6, 2014, in the Korean Intellectual Property Office, the entire contents of which are incorporated herein by reference in their entirety.

BACKGROUND

Field

The described technology generally relates to a battery pack and a driving method thereof.

Description of the Related Technology

Due to environmental problems, resource exhaustion and the like, there is an increased demand for a system that can efficiently use stored power. Also, there is an increasing demand for new, renewable energy that does not cause or cause very little pollution during power generation. An energy storage system connects new, renewable energy, a battery system storing power and existing grid. Much research has been conducted to conform to environmental changes.

One of the important factors for such energy storage systems is efficient management of batteries including charging, discharging, cell balancing, and the like. A battery can be used for a long time by effectively managing the battery. Power can thus be supplied to a load in a stable manner.

SUMMARY OF CERTAIN INVENTIVE ASPECTS

One inventive aspect is a method for driving a battery pack which includes at least one rack battery management system (BMS) including a first communication network configured to communicate with a tray BMS and a subordinate BMS and a second communication network configured to communicate with a superior BMS or a power conversion system, the method including supplying specific data to the first communication network and setting a mode corresponding to a structure of the battery pack depending on whether there has been a response to the specific data.

According to an embodiment, the battery pack includes a first rack BMS and a second rack BMS, including transmitting specific data to the first communication network of the first rack BMS and setting the first rack BMS to a master BMS when response data corresponding to the specific data is received by a second communication network of the first rack BMS.

According to an embodiment, the method includes setting the second rack BMS having received the specific data from the first rack BMS to a slave BMS.

According to an embodiment, the method includes transmitting specific data to the first communication network of a rack BMS and setting the rack BMS to a rack mode showing that only the rack BMS is included in the battery pack when the response data is not received by the second communication network of the rack BMS during a predetermined period.

According to an embodiment, the first and second communication networks are controller area networks (CAN).

According to an embodiment, a data value of the specific data is 0xC6.

Another aspect is a method of driving a battery pack comprising a plurality of rack BMSs, the method including transmitting specific data via a communication network, setting one of the plurality of rack BMSs to a master BMS configured to receive response data corresponding to the specific data and setting another one of the plurality of rack BMSs to a slave BMS configured to supply the response data.

Another aspect is a battery pack, including a first BMS configured to communicate with a power conversion system and a second BMS coupled to a master BMS, wherein the first and the second BMSs transmit specific data for setting master/slave and set one of the first or second BMS to the master BMS, the master BMS having received response data corresponding to the specific data.

According to an embodiment, the other BMS supplying the response data is set to a slave BMS.

Another aspect is a method for driving a battery pack comprising a first rack battery management system (BMS) configured to communicate data with a second BMS, the method comprising outputting first data at the first rack BMS, determining whether a response to the first data has been received, and driving the first rack BMS based on whether the response has been received.

The above method further comprises transmitting the first data to the second rack BMS and setting the first rack BMS as a master BMS when second data corresponding to the first data is received as the response by the first rack BMS.

The above method further comprises setting the second rack BMS as a slave BMS when the second data is received by the first rack BMS.

The above method further comprises driving the first rack BMS in an one rack mode, indicating that the first rack BMS is the only rack BMS included in the battery pack, when the response is not received by the first rack BMS for a predetermined period.

In the above method, each of the first and second rack BMSs includes an interface configured to communicate the first data with each other. In the above method, the interface comprises a controller area network (CAN) interface.

In the above method, a data value of the first data is 0xC6.

Another aspect is a method of driving a battery pack comprising a plurality of rack battery management systems (BMSs) including first and second rack BMSs, the method comprising transmitting first data from the first rack BMS to the second rack BMS and determining whether a response to the first data has been received by the first rack BMS. The method further comprises, in response to determining that the response has been received by the first rack BMS, driving the first rack BMS as a master BMS and driving the second rack BMS as a slave BMS.

In the above method, the rack BMS further comprises a third rack BMS, and wherein the method further comprises driving the third rack BMS as a slave BMS when the second rack BMS receives third data from the third rack BMS.

In the above method, the master BMS is further configured to communicate data with a power conversion system.

In the above method, each of the first and second rack BMSs includes an interface configured to communicate the first data with each other.

In the above method, the interface comprises a controller area network (CAN) interface.

In the above method, the first data includes an 8-bit hexadecimal value.

Another aspect is a battery pack comprising a first battery management system (BMS) configured to communicate data with a second BMS, wherein the first BMS is further configured to i) output first data, ii) determine whether a response to the first data has been received, and iii) operate based on whether or not the response has been received.

In the above battery pack, the first BMS is further configured to enter into an one rack mode when no response has been received.

In the above battery pack, the second BMS is configured to i) receive the first data from the first rack BMS and ii) transmit second data to the first rack BMS corresponding to the response.

The battery pack of claim 16, wherein the first BMS is further configured to operate as a master BMS, wherein the second BMS is further configured to operate as a slave BMS.

In the above battery pack, the first BMS is further configured to communicate data with a power conversion system.

In the above battery pack, each of the first and second rack BMSs includes an interface configured to communicate the first data with each other, wherein the interface comprises a controller area (CAN) interface.

In the above battery pack, the first data includes an 8-bit hexadecimal value.

DETAILED DESCRIPTION OF CERTAIN INVENTIVE EMBODIMENTS

Figure 1:
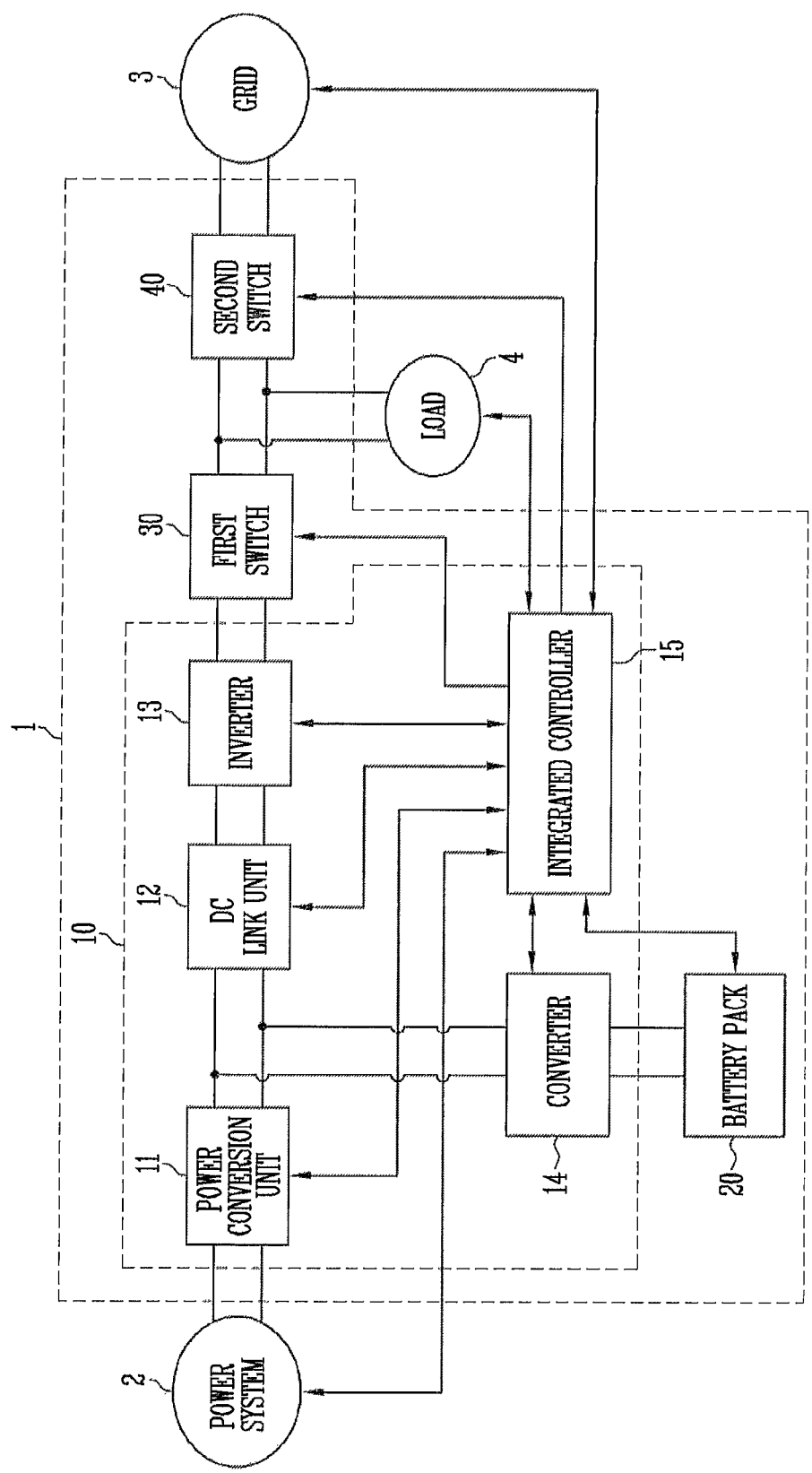
FIG. 1 illustrates an energy storage system according to an embodiment.

Batteries are typically provided in a battery pack. A battery pack can perform internal monitoring for stable operation and collect data measured or obtained from the monitoring. A mode can be set using a switch included as hardware in the battery pack. However, setting the mode using a switch increases manufacturing costs, and errors can occur due to incorrect mode setting.

In the following detailed description, only certain exemplary embodiments have been shown and described, simply by way of illustration. As those skilled in the art would realize, the described embodiments can be modified in various different ways, all without departing from the spirit or scope of the described technology. Accordingly, the drawings and description are to be regarded as illustrative in nature and not restrictive. In addition, when an element is referred to as being "on" other element, it can be directly on the another element or be indirectly on the other element with one or more intervening elements interposed therebetween. Further, it will be understood that when a layer is referred to as being "under" another layer, it can be directly under, and one or more intervening layers can also be present. In addition, it will also be understood that when a layer is referred to as being "between" two layers, it can be the only layer between the two layers, or one or more intervening layers can also be present. Also, when an element is referred to as being "connected to" other element, it can be directly connected to the other element or be indirectly connected to the other element with one or more intervening elements interposed therebetween. Hereinafter, like reference numerals refer to like elements. In the drawings, the thickness or size of layers are exaggerated for clarity and not necessarily drawn to scale.

Example embodiments will now be described more fully hereinafter with reference to the accompanying drawings; however, they can be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions can be exaggerated for clarity of illustration. It will be understood that when an element is referred to as being "between" two elements, it can be the only element between the two elements, or one or more intervening elements can also be present. Like reference numerals refer to like elements throughout. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 illustrates an energy storage system according to an embodiment.

Referring to FIG. 1, the energy storage system 1 supplies power to a load 4 by being linked to a power system 2 and a grid 3.

Depending on the embodiment, certain elements can be removed from or additional elements can be added to the system illustrated in FIG. 1. Furthermore, two or more elements can be combined into a single element, or a single element can be realized as multiple elements. Each of the elements of FIG. 1 can be implemented as a hardware and/or a software module.

The power system 2 can generate power using an energy source. The power system 2 can supply generated energy to the energy storage system 1. The power system 2 can be a solar power system, a wind power generation system, and a tidal current power system. But this is only exemplary, and the power system 2 is not limited thereto. For example, the power system 2 includes all power systems that generate power using new renewable energy such as solar power, geothermal heat, and the like. A solar cell that generates electrical energy using sunlight can be easily installed at homes, factories, and the like, and therefore is suited for application in energy storage system 1.

The grid 3 can include power plants, substations, power lines, and the like. When the grid 3 is in a normal state, the grid 3 can supply power to the load 4 and/or the battery pack 20 by supplying power to the energy storage system 1 and can receive power from the energy storage system 1. When the grid 3 is in an abnormal state, power supply to the energy storage system 1 from the grid 3 can be stopped, and the power supply to the grid 3 from the energy storage system 1 can also be stopped.

The load 4 can consume power generated by the power system 2, power stored in the battery pack 20, or power supplied from the grid 3. For example, the load 4 includes homes, factories, and the like.

The energy storage system 1 can store power generated by the power system 2 in the battery pack 20 and can supply the generated power to the grid 3. Also, the energy storage system 1 can supply power stored in the battery pack 20 to the grid 3, or store the power supplied form the grid 3 in the battery pack 20. The energy storage system 1 can include a power conversion system (PCS) 10 configured to control power conversion, the battery pack 20, a first switch 30 and a second switch 40.

The PCS 10 can convert power from the power system 2, the grid 3 and the battery pack 20 into appropriate power and supply the converted power to where it is needed. The PCS 10 can include a power conversion unit 11, a DC link unit 12, an inverter 13, a converter 14 and an integrated controller 15.

The power conversion unit 11 can be located between the power system 2 and the DC link unit 12. The power conversion unit 11 can transmit power generated by the power system 2 to the DC link unit 12. Here, an output voltage can be converted into a current link voltage.

The power conversion unit 11 can include a converter, a rectifier circuit, and the like, depending on a type of the power system 2. Also, when the power generated is a direct current, the power conversion unit 11 can be set as a direct current to direct current (DC-DC) converter. When the generated power is an alternating current, the power conversion unit 11 can include as a current circuit for converting an alternating current into a direct current. If the power system 2 is a solar power system or a photovoltaic system, the power conversion unit 11 can include a maximum power point tracking (MPPT) converter configured to perform MPPT controlling to achieve the maximum power generated by the power system 2 according to an amount of solar radiation, temperature, and the like.

The DC link unit 12 can maintain a current link voltage in a stable manner by being coupled between the power conversion unit 11 and the inverter 13. For example, a large-capacity capacitor, and the like, is used as the DC link unit 12.

The inverter 13 can be coupled between the DC link unit 12 and the first switch 30. When the inverter 13 is operated in a discharge mode, the inverter 13 can convert a direct current link voltage output from the power system 2 and/or the battery pack 20 into an alternating current and output the same. Also, when the inverter 13 is operated in a charge mode, the inverter 13 can convert an alternating current into a direct current link voltage from the grid 3 and output the same. The inverter 13 can include a filter for removing high frequency in an alternating current, a phase locked loop for phase synchronization, and the like.

The converter 14 can be coupled between the DC link unit 12 and the battery pack 20. When the converter 14 is operated in a discharge mode, the converter 14 can convert power stored in the battery pack 20 into an alternating current link voltage needed by the inverter 13 and output the same. When the converter 14 is operated in a charge mode, the converter 14 can convert, by DC-DC conversion, a voltage of power output from the power conversion unit 11 or the inverter 13 into a voltage capable of being stored in the battery pack 20 (i.e., a charge voltage).

The integrated controller 15 can monitor the status of at least one of the power system 2, the grid 3, the battery pack 20, the load 4, and the like, and control operations of the power conversion unit 11, the DC link unit 12, the inverter 13, the converter 14, the battery pack 20, the first switch 30 and the second switch 40 depending on the monitoring results, a pre-configured algorithm, and the like.

The first switch 30 and the second switch 40 can be directly coupled between the inverter 13 and the grid 3. Depending on the control of the integrated controller 15, current flow between the power system 2 and the grid 3 can be controlled by performing on/off operations. The first switch 30 and the second switch 40 can be turned on/off depending on the state of the power system 2, the grid 3, and the battery pack 20.

When the power of the power system 2 and/or the battery pack 20 is supplied to the load 40, or when the power of the grid 3 is supplied to the battery pack 20, the first switch 30 can be set to on. When the power of the power system 2 and/or the battery pack 20 is supplied to the grid 3, or when the power of the grid 3 is supplied to the load 4 and/or the battery pack 20, the second switch 40 can be set to on. The first switch 30 and the second switch 40 can include a switching device such as a relay, and the like, which can withstand a large current.

The battery pack 20 can receive power from the power system 2 and/or the grid 3, store it, and supply the stored power to the load 4 or the grid 3. The battery pack 20 can include a battery tray as a subcomponent.

Figure 2:
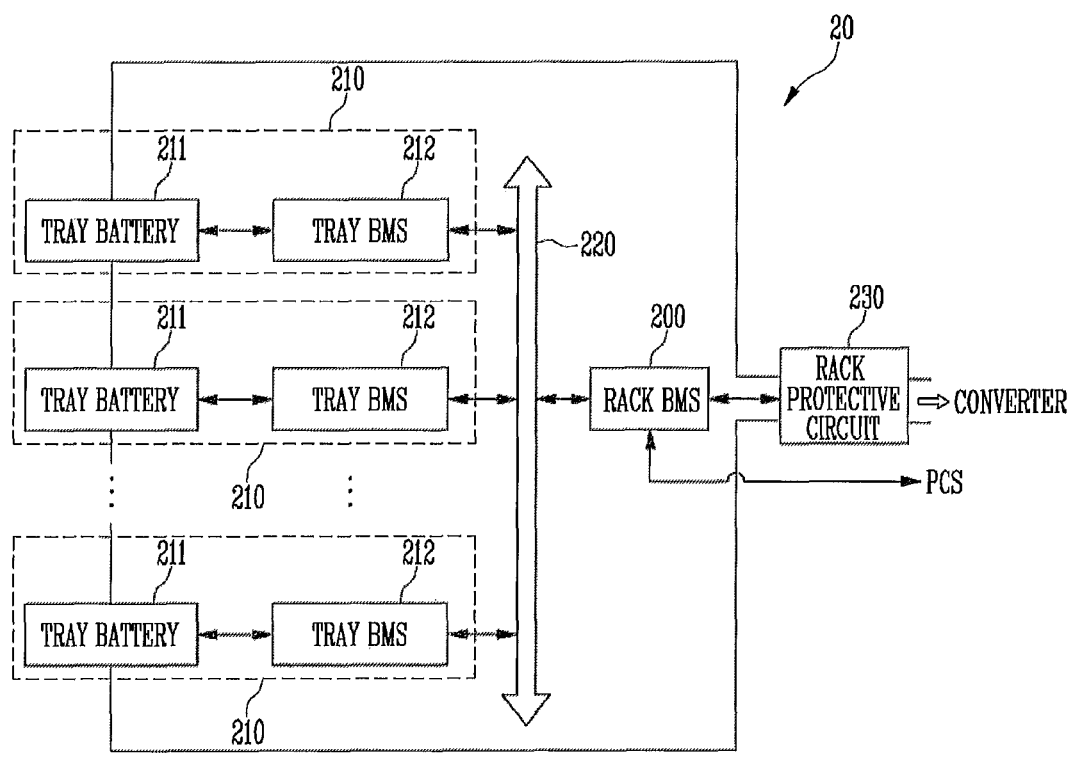
FIG. 2 illustrates a structure of a battery pack according to an embodiment.

FIG. 2 illustrates a structure of a battery pack according to an embodiment. The battery pack 20 can include a battery rack (not shown) as its component, and the battery rack can include a battery tray 210 as its subcomponent.

Referring to FIG. 2, the battery pack 20 includes a rack BMS 200, a plurality of trays 210, a bus line 220, a rack protective circuit 230, and the like. The trays 210 can include at least one tray battery 211 and at least one tray BMS 212.

The rack BMS 200 can control charge and discharge operations of the battery pack 20 by controlling the rack protective circuit 230. Also, the rack BMS 200 can monitor a state of the battery pack 20, for example, the temperature, voltage, current, and the like, and transmit the monitoring results to the PCS 10 (e.g., the integrated controller 15).

Also, the rack BMS 200 can receive tray battery 211 information supplied from a tray BMS 212. Based at least in part on the supplied information, the rack BMS 200 can control the tray BMS 212. Also, the rack BMS 200 can transmit information received from the tray BMS 212 or analysis results obtained therefrom to the PCS 10 and transmit a control signal received from the PCS 10 to the tray BMS 212.

The trays 210 can store power as a subcomponent of the battery rack, and supply the stored power to the grid 3, the load 4, and the like.

The tray battery 211 can include a battery cell as a subcomponent for storing power. The number of the battery cells included in the tray battery 211 can be determined by an output voltage that is being demanded. A secondary battery can be recharged. For example, nickel-cadmium battery, a lead storage battery, a nickel-metal hydride (NiHM) battery, a lithium ion battery, a lithium polymer battery, and the like are used as a battery cell.

The tray BMS 212 can control charge and discharge operations of the tray battery 211. Also, the tray BMS 212 can monitor the state of the tray battery 211, e.g., the temperature, voltage, current, and the like. The monitored information can be transmitted to the rack BMS 200 from the tray BMS 212.

The bus line 220 is a path through which data or a commands are transmitted between the rack BMS 200 and the trays BMS 212. A controller area network (CAN) communication network can be used for the bus line 220.

The rack protective circuit 230 can block power supply based at least in part on the control of the rack BMS 200. The rack protective circuit 230 can include a relay, a fuse, and the like.

The rack BMS 200 and the tray BMS 212 can communicate data to each other using the bus line 220, but the embodiments are not limited thereto. For example, the rack BMS 200 communicate data with each of the tray BMS 212 one-to-one.

Figure 3A:
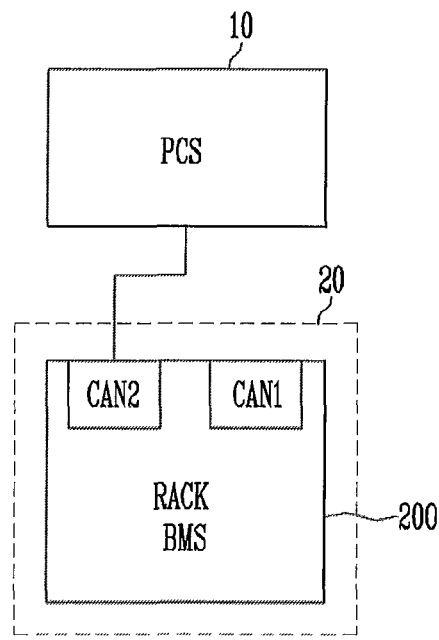
FIGS. 3A and 3B illustrate a rack battery management system (BMS) included in the battery pack.
Figure 3B:
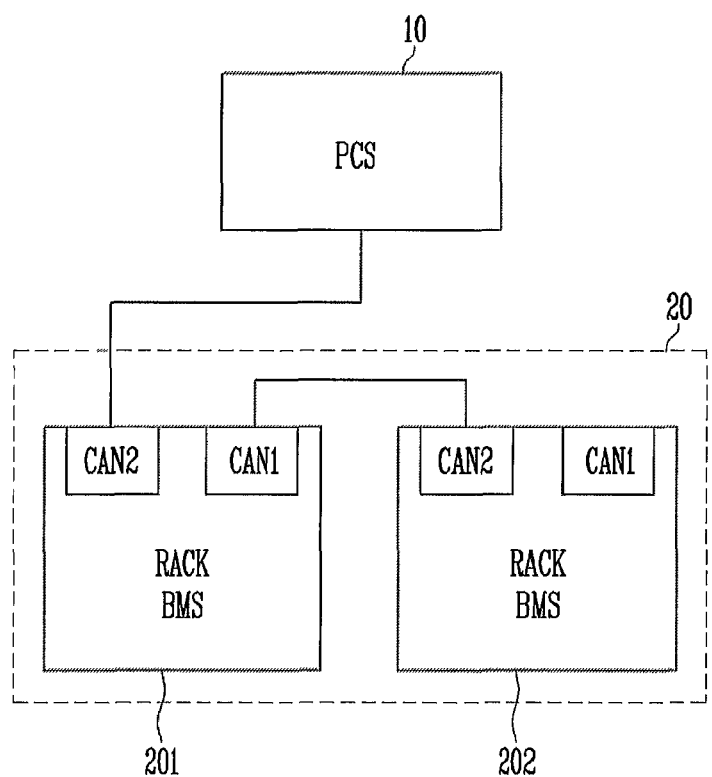

FIGS. 3A and 3B illustrate the rack BMS 200, 201 and 202 included in the battery pack 20. For convenience of illustration, FIGS. 3A and 3B illustrate only the rack BMS 200, 201 and 202 from the structure of the battery pack 20.

Referring to FIGS. 3A and 3B, the battery pack 20 includes one rack BMS 200 or two rack BMS 201 and 202.

Each of the rack BMSs 200, 201 and 202 can be coupled to a first communication network CAN1 and a second communication network CAN2. The first communication network CAN1 can be used for communication with the tray BMS 212 and a second rack BMS or slave BMS. The second communication network CAN2 can be used for communication with a first rack BMS or master BMS or the PCS 10.

In some embodiments, when two rack BMSs 201 and 202 are included in the battery pack 20, any one of the rack BMSs is set as the master BMS 201, and the remaining BMS is designated as the slave BMS 202. The master BMS 201 can collect information related to a battery module included in the slave BMS 202 by data communicating with the slave BMS 202 for integrated management of the battery included in the battery pack 20. Or, the master BMS 201 can supply a control command to the slave BMS 202 to control charge/discharge operations.

In some embodiments, when two rack BMSs 201 and 202 are included in the battery pack 20, the battery pack 20 automatically sets the master BMS 201 and the slave BMS 202 using an algorithm without additional hardware. Also, in some embodiments, when one rack BMS 200 is included in the battery pack 20, the battery pack 20 is automatically set to a rack BMS mode.

Typically, two switches are needed to set the number of rack BMSs included in the battery pack 20, a master BMS and a slave BMS. However, according to some embodiments, a hardware-based switch is omitted.

Figure 4:
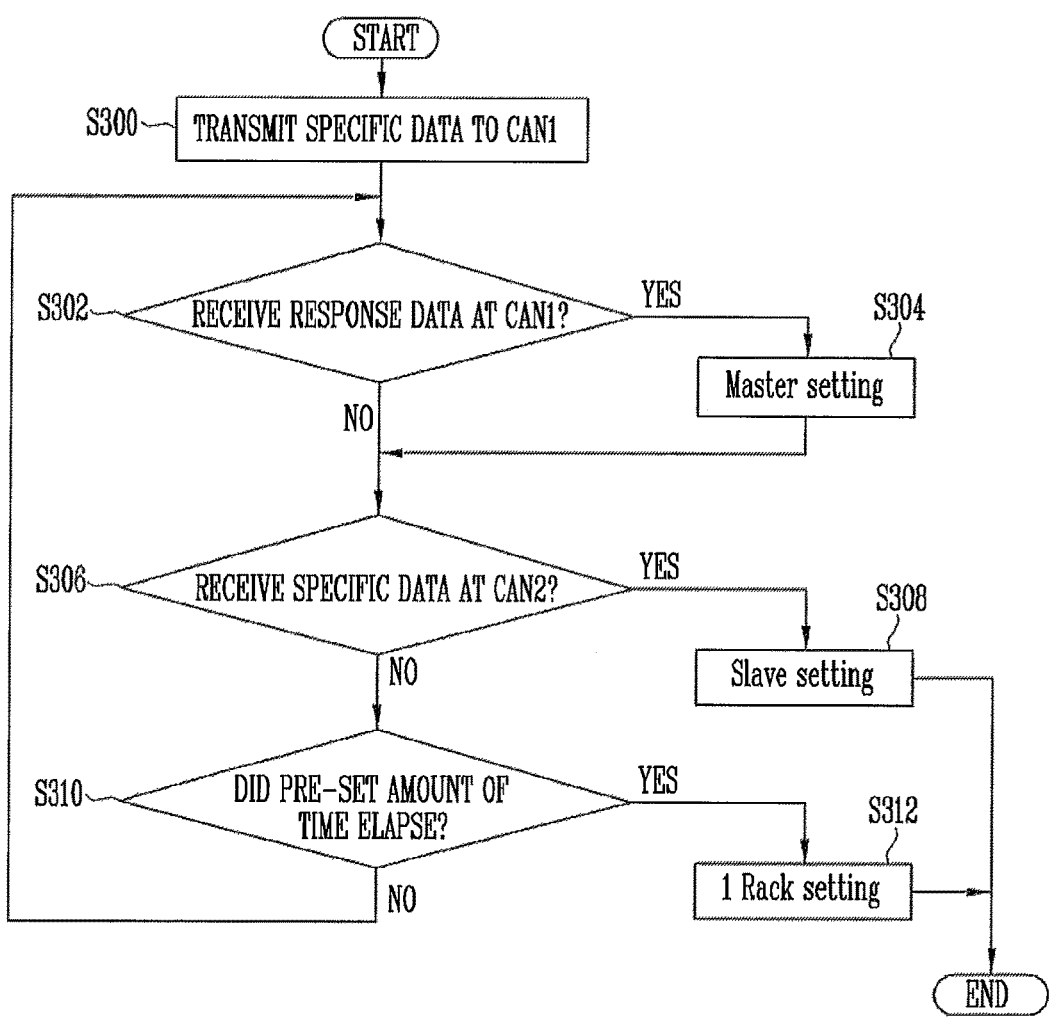
FIG. 4 is a flowchart of a method for setting a mode of the battery pack.

FIG. 4 illustrates a flowchart of a method for setting a mode of the battery pack.

Referring to FIG. 4, each of the rack BMSs 200, 201 and 202 transmits specific data or first data. The value of the specific data can be any 8-bit hexadecimal value. For example, 0xC6 data is transmitted to a first communication network CAN1 in an initial operation. However, the specific data can be in any format. The rack BMSs 200, 201 and 202, which have received the specific data, check whether response data or second data corresponding to the specific data is received by the first communication network CAN1 (S302).

In some embodiments, the FIG. 4 procedure is implemented in a conventional programming language, such as C or C++ or another suitable programming language. The program can be stored on a computer accessible storage medium of the energy storage system 1, for example, a memory (not shown) of the energy storage system 1 or integrated controller 15. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 4.

In some embodiments, the specific data that is transmitted to the first communication network CAN1 from the first rack BMS 200 and the third rack BMS 202 is not transferred to other rack BMS (S300). Accordingly, no additional response data can be received. However, in some embodiments, the specific data transmitted to the first communication network CAN1 from the second rack BMS 201 is transferred to the third rack BMS 202 (S300). The third rack BMS 202, which has received the specific data, can supply response data to the first communication network CAN1 of the second rack BMS 201 via its own second communication network CAN2.

Therefore, the second rack BMS 201 can receive response data (S302) and can be set to the master BMS based at least in part on having received the response data (S304). The second communication network CAN2 of the third rack BMS 202 can be set to the slave BMS (S306 and S308). Meanwhile, in S302 and S306, if no additional data is received, the corresponding rack BMS (i.e., the first rack BMS 200) can check whether a pre-set amount of time has elapsed (S310). In S310, if the pre-set amount of time has elapsed, it can be determined that one rack BMS 200 is included in the battery pack 20, and is set to one rack mode based at least in part on (S312).

As described above, in some embodiments, the master BMS 201 and the slave BMS 202 are set without additional hardware. Also, if one rack BMS 200 is included in the battery pack 20, it is automatically set to a corresponding mode.

According to at least one of the disclosed embodiments, a mode is automatically set based at least in part on the number of rack BMSs included in the battery pack. Furthermore, if two rack BMSs are included in the battery pack, a master BMS and a slave BMS can be automatically set. That is, without additional hardware, a mode corresponding to a structure of the battery pack can be automatically set, and accordingly, the manufacturing cost and the likelihood of errors being made can be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment can be used singly or in combination with features, characteristics, and/or elements described in connection with other embodiments unless otherwise specifically indicated. Accordingly, it will be understood by those of skill in the art that various changes in form and details can be made without departing from the spirit and scope of the present invention as set forth in the following claims.

What is claimed is:

1. A method for driving a battery pack comprising a first rack battery management system (BMS) configured to communicate data with a second rack BMS, the method comprising:

outputting first data at the first rack BMS of the battery pack;

determining whether a response to the first data has been received from another rack BMS within the battery pack;

setting a driving mode of the first rack BMS based on whether the response has been received; and driving the first rack BMS based on the set driving mode, wherein the first and second BMSs comprises first and second communication interfaces, wherein the first communication interface of the first rack BMS is configured to output the first data to the second interface of the second rack BMS, and wherein the second communication interface of the second rack BMS is configured to transmit the response to the first communication interface of the first rack BMS.

2. The method of claim 1, further comprising:

setting the first rack BMS as a master BMS when second data corresponding to the first data is received as the response by the first rack BMS.

3. The method of claim 2, further comprising setting the second rack BMS as a slave BMS when the second data is received by the first rack BMS.

4. The method of claim 1, further comprising:

driving the first rack BMS in an one rack mode, indicating that the first rack BMS is the only rack BMS included in the battery pack, when the response is not received by the first rack BMS for a predetermined period.

5. The method of claim 1, wherein the interface comprises a controller area network (CAN) interface.

6. The method of claim 1, wherein a data value of the first data is 0xC6.

7. A method of driving a battery pack comprising a plurality of rack battery management systems (BMSs) including first and second rack BMSs, the method comprising:

transmitting first data from the first rack BMS to the second rack BMS within the battery pack;

determining whether the first rack BMS has received a response to the first data from the second rack BMS;

setting driving modes of the first and second rack BMSs based on whether the first rack BMS has received the response from the second rack BMS; and when the first rack BMS has received the response from the second rack BMS, driving the first rack BMS as a master BMS and the second rack BMS as a slave BMS, wherein the first and second BMSs comprises first and second communication interfaces, wherein the first communication interface of the first rack BMS is configured to output the first data to the second interface of the second rack BMS, and wherein the second communication interface of the second rack BMS is configured to transmit the response to the first communication interface of the first rack BMS.

8. The method of claim 7, wherein the rack BMSs further comprise a third rack BMS, and wherein the method further comprises driving the third rack BMS as a slave BMS when the second rack BMS receives third data from the third rack BMS.

9. The method of claim 7, wherein the master BMS is further configured to communicate data with a power conversion system.

10. The method of claim 7, wherein the interface comprises a controller area network (CAN) interface.

11. The method of claim 7, wherein the first data includes an 8-bit hexadecimal value.

12. A battery pack, comprising:

a first rack battery management system (BMS) and a second rack BMS, wherein the first rack BMS configured to i) output first data, ii) determine whether a response to the first data has been received from the second rack BMS within the battery pack, iii) set a driving mode of the first rack BMS based on whether the response has been received, and iv) operate based on the set driving mode, wherein the first and second BMSs comprises first and second communication interfaces, wherein the first communication interface of the first rack BMS is configured to output the first data to the second interface of the second rack BMS, and wherein the second communication interface of the second rack BMS is configured to transmit the response to the first communication interface of the first rack BMS.

13. The battery pack of claim 12, wherein the first rack BMS is further configured to enter into a one rack mode when no response has been received by the first rack BMS for a predetermined period.

14. The battery pack of claim 12, wherein the second BMS is configured to i) receive the first data from the first rack BMS and ii) transmit second data to the first rack BMS corresponding to the response.

15. The battery pack of claim 14, wherein the first rack BMS is further configured to operate as a master BMS, and wherein the second rack BMS is further configured to operate as a slave BMS.

16. The battery pack of claim 12, wherein the first rack BMS is further configured to communicate data with a power conversion system.

17. The battery pack of claim 12, wherein each of the first and second rack BMSs includes an interface configured to communicate the first data with each other, and wherein the interface comprises a controller area (CAN) interface.

18. The battery pack of claim 12, wherein the first data includes an 8-bit hexadecimal value.

* * * * *